US012606466B2

(12) United States Patent
Yang et al.

(10) Patent No.: US 12,606,466 B2
(45) Date of Patent: Apr. 21, 2026

(54) ELECTRODE PLATE, ELECTROLYSIS APPARATUS, AND LAUNDRY TREATMENT DEVICE

(71) Applicant: WUXI LITTLE SWAN ELECTRIC CO., LTD., Wuxi (CN)

(72) Inventors: Qingbo Yang, Wuxi (CN); Ming Xiong, Wuxi (CN); Cunling Zhou, Wuxi (CN); Jiuxing Gao, Wuxi (CN); Jingxian Qian, Wuxi (CN)

(73) Assignee: WUXI LITTLE SWAN ELECTRIC CO., LTD., Wuxi (CN)

( * ) Notice: Subject to any disclaimer, the term of this patent is extended or adjusted under 35 U.S.C. 154(b) by 656 days.

(21) Appl. No.: 17/611,176

(22) PCT Filed: Jul. 23, 2020

(86) PCT No.: PCT/CN2020/103868
§ 371 (c)(1),
(2) Date: Nov. 15, 2021

(87) PCT Pub. No.: WO2021/103605
PCT Pub. Date: Jun. 3, 2021

(65) Prior Publication Data
US 2022/0212965 A1 Jul. 7, 2022

(30) Foreign Application Priority Data

Nov. 29, 2019 (CN) .......................... 201911204716.2
Nov. 29, 2019 (CN) .......................... 201922107348.1

(51) Int. Cl.
*C02F 1/461* (2023.01)
*C25B 1/04* (2021.01)
(Continued)

(52) U.S. Cl.
CPC ............ *C02F 1/46109* (2013.01); *C25B 1/04* (2013.01); *C25B 9/17* (2021.01); *D06F 35/003* (2013.01);
(Continued)

(58) Field of Classification Search
CPC ................................ D06F 35/003; C25B 1/04
See application file for complete search history.

(56) References Cited

U.S. PATENT DOCUMENTS

2002/0088061 A1* 7/2002 Kown ................... D06F 35/003
68/12.02
2003/0213503 A1* 11/2003 Price ................... C11D 3/3953
134/40
(Continued)

FOREIGN PATENT DOCUMENTS

CN        1580365 A     2/2005
CN     101570932 A    11/2009
(Continued)

OTHER PUBLICATIONS

International Search Report of PCT No. PCT/CN2020/103868.
(Continued)

*Primary Examiner* — Ciel P Contreras
(74) *Attorney, Agent, or Firm* — K&L Gates LLP

(57) ABSTRACT

The embodiments of the present disclosure provide an electrode plate, an electrolysis apparatus, and a laundry treatment device. Multiple through holes penetrating the electrode plate in the thickness direction of the electrode plate are formed in the electrode plate. The density of the through holes in the electrode plate is 1-10/cm$^2$. According to the electrode plate in the embodiments of the present disclosure, on the one hand, because the density of surface charge at the junction of the inner wall of the through hole and the surface of the electrode plate is larger, and the (Continued)

electric field intensity nearby is higher, the electrolysis efficiency can be greatly improved, more active substances such as hydroxyl radicals and active chlorine can be generated, and more microbubbles can also be generated, which can improve the sterilization, cross color prevention and washing effects.

4 Claims, 14 Drawing Sheets

(51) Int. Cl.
 *C25B 9/17*   (2021.01)
 *D06F 35/00*  (2006.01)
 *D06F 39/08*  (2006.01)

(52) U.S. Cl.
 CPC .. *D06F 39/088* (2013.01); *C02F 2201/46105* (2013.01); *C02F 2307/12* (2013.01)

(56)     References Cited

U.S. PATENT DOCUMENTS

| | | | |
|---|---|---|---|
| 2006/0151316 A1 | 7/2006 | Ooe et al. | |
| 2008/0041117 A1* | 2/2008 | Lee ..................... | D06F 35/003 |
| | | | 68/17 R |
| 2008/0244835 A1* | 10/2008 | Lim ..................... | D06F 35/003 |
| | | | 68/17 R |
| 2014/0027307 A1* | 1/2014 | Manikkathiagarajah ................... | |
| | | | C02F 1/46109 |
| | | | 205/758 |

FOREIGN PATENT DOCUMENTS

| | | | | |
|---|---|---|---|---|
| CN | 103603005 A | 2/2014 | | |
| CN | 107488969 A | 12/2017 | | |
| CN | 108883951 A | 11/2018 | | |
| CN | 110436582 A | 11/2019 | | |
| CN | 110438733 A | 11/2019 | | |
| CN | 211733938 U | 10/2020 | | |
| EP | 1785518 A1 * | 5/2007 | .......... | D06F 35/003 |
| JP | H08276184 A | 10/1996 | | |
| JP | 3190659 U | 5/2014 | | |
| JP | 2016196674 A | 11/2016 | | |
| KR | 20030024632 A | 3/2003 | | |
| WO | 2011135749 A1 | 11/2011 | | |
| WO | 2019068337 A1 | 4/2019 | | |

OTHER PUBLICATIONS

Supplementary European Search Report issued on Jun. 22, 2022 regarding the EP Application No. 20894695.4.
First OA received in Application No. BR112021025385-8 issue by Brazil; mailed Feb. 5, 2024.
First OA received in JP Application No. 2022-505488; mailed Jan. 4, 2023.
Notice of Allowance received in JP Application No. 2022-505488; mailed Jun. 6, 2023.
First OA Received in CN Application No. 201911204716.2; mailed Nov. 29, 2024.

* cited by examiner

ELECTRODE PLATE, ELECTROLYSIS APPARATUS, AND LAUNDRY TREATMENT DEVICE

CROSS-REFERENCES TO RELATED APPLICATIONS

The present disclosure is a national phase application of International Application No. PCT/CN2020/103868, filed on Jul. 23, 2020, which claims priority to Chinese patent application No. 201911204716.2 filed on Nov. 29, 2019 and Chinese patent application No. 201922107348.1 filed on Nov. 29, 2019, the entireties of which are herein incorporated by reference.

FIELD

The disclosure relates to the field of electrolysis of water, and in particular to an electrode plate, an electrolysis apparatus, and a laundry treatment device.

BACKGROUND

Due to an extremely high oxidation potential (2.80 eV), a hydroxyl free radical (OH) has strong oxidation capacity, and may generate a rapid chain reaction with most of organic pollutants and oxidize harmful substances into $CO_2$, $H_2O$ or mineral salt without selectivity, and may not induce secondary pollution. Therefore, an electrolysis electrode may be applied to a field of a laundry treatment device, and laundries are sterilized and disinfected through electrolyzed water. However, in a related art, the electrolysis electrode is in a shape of a smooth flat plate, therefore, in a process of electrolysis of water, an electrolysis efficiency of the electrolysis electrode is relatively low, and bubbles on a surface of the electrolysis electrode are likely to gather to form large bubbles.

SUMMARY

In view of the above, embodiments of the disclosure are intended to provide an electrode plate with a relatively high electrolysis efficiency, an electrolysis apparatus, and a laundry treatment device.

Some embodiments of the disclosure provide an electrode plate, having formed therein multiple through holes penetrating the electrode plate in a thickness direction of the electrode plate, and a distribution density of the through holes in the electrode plate is 1-10/cm².

In some implementations, each of the through holes is circular and has a diameter of 2 mm to 5 mm.

In some implementations, a distance between adjacent two of the through holes is 2 mm to 10 mm.

In some implementations, a distance between the through hole closest to an edge of the electrode plate and the edge of the electrode plate is 2 mm to 10 mm.

Embodiments of the disclosure provide an electrolysis apparatus, including a cathode conductive connector, an anode conductive connector, two electrode plates of any of the above descriptions, here one of the electrode plates is a cathode plate, the other of the electrode plates is an anode plate, the cathode plate and the anode plate are arranged in a stack, and the through holes in the anode plate correspond and align with the through holes in the cathode plate; the cathode conductive connector is in conductive connection with the cathode plate; and the anode conductive connector is in conductive connection with the anode plate.

Embodiments of the disclosure provide a laundry treatment device, including a cylinder assembly including an outer cylinder and an inner cylinder rotationally arranged within the outer cylinder; and the electrolysis apparatus of any of the above descriptions, in which the cathode plate and the anode plate are arranged between the outer cylinder and the inner cylinder, and an end, away from the anode plate, of the anode conductive connector is located outside of the outer cylinder, and an end, away from the cathode plate, of the cathode conductive connector is located outside of the outer cylinder.

Embodiments of the disclosure provide another laundry treatment device, including a cylinder assembly; and the electrolysis apparatus of any of the above descriptions, arranged on a water inlet channel provided in the laundry treatment device and communicating with the cylinder assembly, to electrolyze water in the water inlet channel.

In some implementations, the electrolysis apparatus includes a shell in which an electrolysis cavity, as well as a to-be-electrolyzed water inlet and an electrolyzed water outlet communicating with the electrolysis cavity are formed, and the cathode plate and the anode plate are arranged within the electrolysis cavity, and an end, away from the cathode plate, of the cathode conductive connector is located outside of the shell, and an end, away from the anode plate, of the anode conductive connector is located outside of the shell, and the electrolysis cavity is located in the water inlet channel.

In some implementations, the laundry treatment device includes a water inlet valve communicating with the to-be-electrolyzed water inlet, and a detergent box provided with a storage tank containing a detergent and communicating with the electrolyzed water outlet to guide the electrolyzed water within the electrolysis cavity to the storage tank.

In some implementations, the water inlet valve is provided with a water inlet, a first water outlet communicating with the to-be-electrolyzed water inlet, and a second water outlet communicating with the detergent box, and the water inlet valve selectively communicates the water inlet with the first water outlet or the second water outlet.

In some implementations, the electrolyzed water outlet is located at an end, close to the detergent box, of the shell, and the to-be-electrolyzed water inlet is located at an end, away from the electrolyzed water outlet, of the shell.

In some implementations, the laundry treatment device includes a workbench arranged on a top side of the cylinder assembly and provided with a laundry feeding opening, and the electrolysis apparatus is fixedly connected to a bottom side of the workbench.

In some implementations, the shell includes a shell body, as well as a first end cover and a second end cover hermetically arranged at two ends, opposite in a length direction, of the shell body, a hollow containing space is enclosed by the shell body, the first end cover and the second end cover together, the electrolysis cavity is formed by at least a part of the containing space, the electrolyzed water outlet is formed in the first end cover, and the to-be-electrolyzed water inlet is formed in the second end cover.

In the electrode plate according to the embodiments of the disclosure, on one hand, because a charge density at the junction of an inner wall of the through hole and a surface of the electrode plate is relatively large, and an electric field intensity nearby is relatively high, an electrolysis efficiency may be greatly improved, more active substances such as ·OH, active chlorine and the like may be generated, while more microbubbles may also be generated, which may improve the sterilization, cross-color prevention and washing effects; on the other hand, water flow may flow from one side of the electrode plate to the other side of the electrode plate through the through hole, and may take away the microbubbles on the surface of the electrode plate and a surface of the inner wall of the through hole in time, to prevent the microbubbles from gathering to form large bubbles.

DETAILED DESCRIPTION OF THE DISCLOSURE

It should be noted that embodiments of the disclosure may be combined with each other without conflict, and detailed descriptions in a specific implementation should be understood as an explanation of embodiments of the disclosure and should not be taken as unduly limitations of the disclosure.

Figure 4:
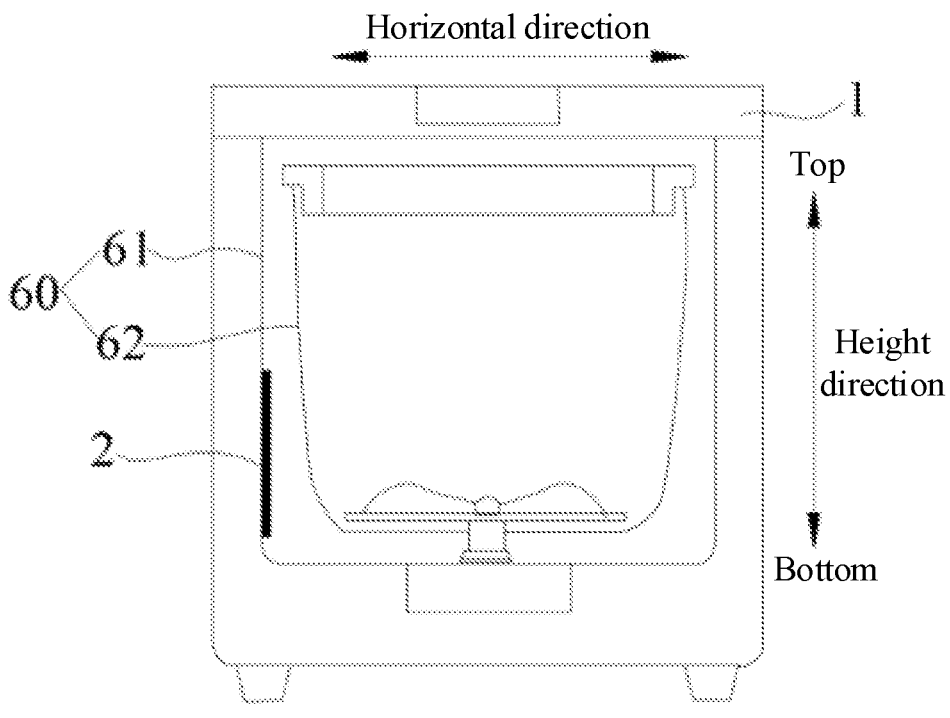
FIG. 4 illustrates a schematic structural diagram of a laundry treatment device according to a first embodiment of the disclosure, here the laundry treatment device is provided with the electrolysis apparatus according to the first embodiment.

During describing the embodiments of disclosure, orientation or position relationships indicated by terms "upper", "lower", "front", "rear", "horizontal", "top" and "bottom" are based on orientation or position relationships as shown in FIG. 4, and it should be understood that the orientation terms are intended only to conveniently describe the disclosure and simplify descriptions, rather than to indicate or imply that devices or components indicated by them must be in specific orientations or structured and operated in specific orientations, and thus should not be understood as limitations of the disclosure.

Figure 1:
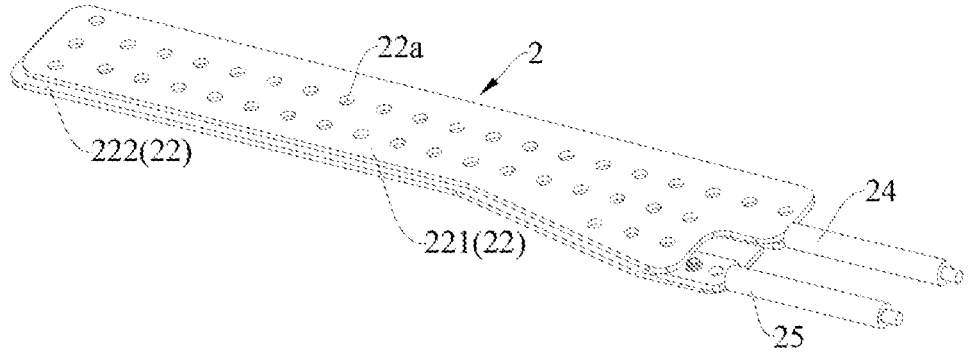
FIG. 1 illustrates a schematic structural diagram of an electrolysis apparatus according to a first embodiment of the disclosure.
Figure 2:
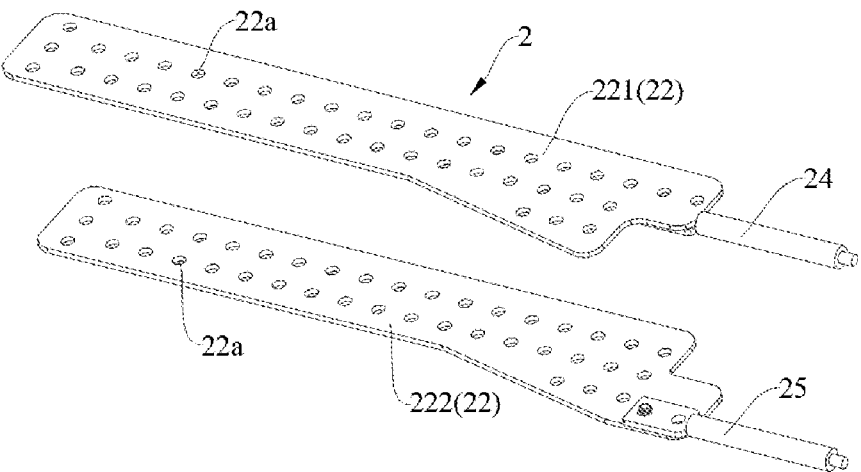
FIG. 2 illustrates a schematic exploded diagram of the structure as shown in FIG. 1.

Referring to FIGS. 1 and 2, the embodiments of the disclosure provide an electrolysis apparatus 2 which includes two electrode plates 22, one of the electrode plates 22 is an anode plate 222 and the other of the electrode plates 22 is a cathode plate 221, when the anode plate 222 and the cathode plate 221 are energized, then the anode plate 222 and the cathode plate 221 may begin to electrolyze water. In an embodiment, the electrolysis apparatus 2 further includes a cathode conductive connector 24 and an anode conductive connector 25, the cathode conductive connector 24 is in conductive connection with the cathode plate 221, exemplarily, the cathode conductive connector 24 is welded to the cathode plate 221, and the anode conductive connector 25 is in conductive connection with the anode plate 222, exemplarily, the anode conductive connector 25 is welded to the anode plate 222.

The cathode conductive connector 24 and the anode conductive connector 25 are configured to connect a power supply, and specific structures of the cathode conductive connector 24 and the anode conductive connector 25 are not limited, as long as connection to the power supply is facilitated. In an embodiment, the cathode conductive connector 24 and the anode conductive connector 25 are cylindrical.

The embodiment of the disclosure is described with respect to an example of the application of the electrolysis apparatus 2 to a laundry treatment device, and it may be understood that the electrolysis apparatus 2 may also be used in other fields.

The specific type of the laundry treatment device is not limited, and for example, may be a washing machine, a laundry dryer, an all-in-one washing and drying machine.

Water for washing laundries in the laundry treatment device is electrolyzed by the electrode plate 22 to generate ·OH with strong oxidation activity, OH have an extremely high oxidation potential (2.80 eV), so that ·OH have extremely strong oxidation capacity, may generate a rapid chain reaction with most of organic pollutants, and may realize sterilization and disinfection at a low temperature and does not damage laundries, a part of ·OH react with chlorine molecules in tap water to generate active chlorine, and the active chlorine may exist for a long time and has a long-term bacteriostatic effect; and a large number of ·OH oxidize and destroy chromophoric groups of dye molecules of colored laundries dissociated into water during washing to decolorize dyes, so that the dissociated dyes are prevented from staining light-color laundries to induce cross-color, and the dye molecules are decomposed into harmless carbon dioxide, water and inorganic salt through continuous reaction. Furthermore, a large number of microbubbles may be generated by the electrode plate 22, since a diameter of each of the microbubbles is small, generally smaller than 50 μm, the microbubbles may well enter an interior of laundry fibers during washing, circulating flushing of the microbubbles is continuously generated through blasting, adsorption and floating effects of the microbubbles, to assist a detergent to thoroughly remove sebum, grease, tiny dust and other dirt accumulated in the laundry fibers, and thus the washing effect may be improved.

Figure 3:
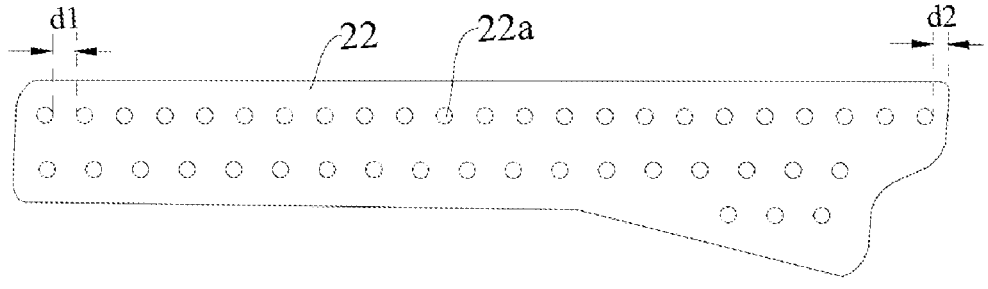
FIG. 3 illustrates a schematic structural diagram of an electrode plate of the electrolysis apparatus as shown in FIG. 1.

In order to improve the washing effect, abundant ·OH, active chlorine, microbubbles and the like need to be contained in electrolyzed water, therefore according to the embodiment of the disclosure, referring to FIG. 3, multiple through holes 22a penetrating the electrode plate 22 in a thickness direction of the electrode plate 22 are formed in the electrode plate 22, and a distribution density of the through holes 22a in the electrode plate 22 is 1-10/cm², 1-10 through holes 22a are distributed per square centimeter of the electrode plate 22, for example, one, two, three, four, five, six, seven, eight, nine, or ten through holes 22a may be distributed per square centimeter of the electrode plate 22. On one hand, because a charge density at the junction of an inner wall of the through hole 22a and a surface of the electrode plate 22 is relatively large, and an electric field intensity nearby is relatively high, an electrolysis efficiency may be greatly improved, more active substances such as ·OH, active chlorine and the like may be generated, while more microbubbles may also be generated, which may improve the sterilization and washing effects; on the other hand, water flow may flow from one side of the electrode plate 22 to the other side of the electrode plate 22 through the through hole 22a, and may take away the microbubbles on the surface of the electrode plate 22 and a surface of the inner wall of the through hole 22a in time, to prevent the microbubbles from gathering to form large bubbles.

The shape of the through hole 22a is not limited, and for example, may be circular, oval, polygonal or the like. Exemplarily, in an embodiment of the disclosure, referring to FIG. 3, each of the through holes 22a is circular and has a diameter of 2 mm to 5 mm, that is, the diameter of the through hole 22a is in a range of 2 mm to 5 mm, that is, the range of the diameter of the through hole 22a is 2 mm to 5 mm, and for example, may be 2 mm, 3 mm, 4 mm, 5 mm or the like. The through holes 22a in this dimensional range facilitate the formation of the microbubbles at the through holes 22a on one hand, and facilitate the detachment of the microbubbles from the surface of the electrode plate 22 on the other hand. Specifically, when the diameter of the through hole 22a is too large, the number of the through holes 22a may be very small without changing the area and shape of the electrode plate 22, and the number of the microbubbles may also be small; and when the diameter of the through hole 22a is too small, a tip area of an edge of the through hole 22a is small, which is not conducive to the generation of the microbubbles, furthermore, the generated microbubbles are difficult to quickly overflow in the through hole 22a and easily gather in the through hole 22a to form large bubbles.

In an embodiment, a distance d2 between the through hole 22a closest to an edge of the electrode plate 22 and the edge of the electrode plate 22 is 2 mm to 10 mm, that is, the distance d2 has a value in a range of 2 mm to 10 mm, and for example, may be 2 mm, 3 mm, 4 mm, 5 mm, 6 mm, 7 mm, 8 mm, 9 mm, or 10 mm. Therefore, processing of the through holes 22a is facilitated in case that more through holes 22a are formed in the electrode plate 22. Specifically, when the through holes 22a are too close to the edge, the through holes 22a close to the edge may be broken in the process of processing the through holes 22a, sharp thorns may be formed in the edge of the electrode plate 22, and when the electrode plate 22 is applied to the laundry treatment device, the thorns at the edge of the electrode plate 22 easily hook fluffs mixed in water, so that the fluffs are easily to accumulate on the electrode plate 22.

In an embodiment, a distance d1 between adjacent two of the through holes 22a is 2 mm to 10 mm, that is, the distance d1 has a value in a range of 2 mm to 10 mm, and for example, may be 2 mm, 3 mm, 4 mm, 5 mm, 6 mm, 7 mm, 8 mm, 9 mm, or 10 mm. That is, it is necessary to guarantee a suitable distance between adjacent two of the through holes 22a for facilitating processing. Specifically, during processing, a material of the electrode plate 22 is pressed by a die to form the above-described through holes 22a in the electrode plate 22. When the distance between two through holes 22a is too small, the through holes 22a may be broken, thorns may be formed in the electrode plate 22, and easily hook fluffs mixed in water, so that the fluffs are easily to accumulate on the electrode plate 22. When the distance between two through holes 22a is too large, the utilization rate is relatively low and the number of the through holes 22a may be reduced. It should be noted that the distance between adjacent two of through holes 22a refers to a distance between a reference through hole and an edge of an adjacent through hole, by taking any one of the through holes as the reference through hole, and taking the through hole of the remaining through holes closest to the reference through hole as the adjacent through hole.

The embodiments of the disclosure also provide the laundry treatment device as described above, referring to FIGS. 4 and 5, the laundry treatment device includes a cylinder assembly 60 and the electrolysis apparatus 2 of any of the above descriptions. Here the cylinder assembly 60 includes an outer cylinder 61 and an inner cylinder 62 rotationally arranged within the outer cylinder 61.

It may be understood that the inner cylinder 62 as described above may be a perforated inner cylinder or a non-perforated inner cylinder. Responsive to the inner cylinder 62 being the perforated inner cylinder, the outer cylinder 61 is configured to contain water; and responsive to the inner cylinder 62 being the non-perforated inner cylinder, the inner cylinder 62 itself is configured to contain water, that is, the inner cylinder 62 may contain both water and laundries, and during washing, the water in the inner cylinder 62 does not enter the outer cylinder 61.

It should be noted that the position of the electrolysis apparatus 2 in the laundry treatment device is not limited, as long as the water for washing laundries in the laundry treatment device may be electrolyzed.

The laundry treatment device according to several specific embodiments will be described in detail below.

First Embodiment

Referring to FIG. 4, according to the laundry treatment device of the first embodiment of the disclosure, the inner cylinder 62 is a perforated inner cylinder, two electrode plates 22 are arranged between the outer cylinder 61 and the inner cylinder 62, an end, away from the anode plate 222, of the anode conductive connector 25 is located outside of the outer cylinder 61, and an end, away from the cathode plate 221, of the cathode conductive connector 24 is located outside of the outer cylinder 61. Further, the two electrode plates 22 are arranged on an inner wall, in a height direction, of the outer cylinder 61. According to the laundry treatment device of the embodiment, the density of the through holes 22a in the electrode plates 22 enables the electrode plates 22 to generate more active substances such as ·OH, active chlorine and the like on one hand, and fluffs are not easily to block the electrode plates 22 on the other hand.

Second Embodiment

Figure 5:
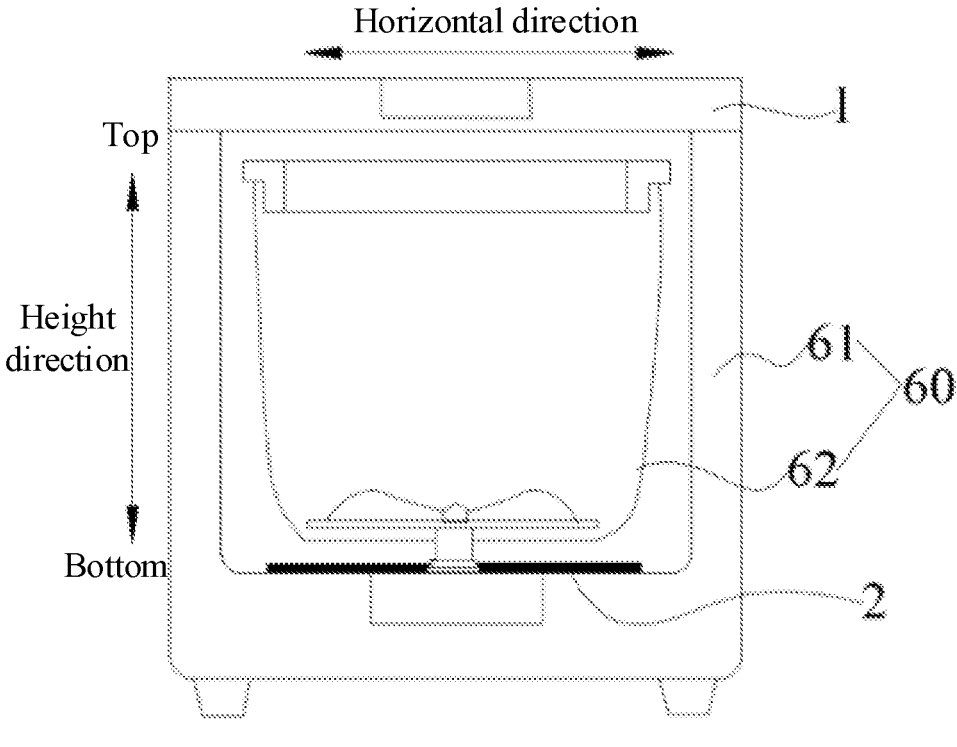
FIG. 5 illustrates a schematic structural diagram of a laundry treatment device according to a second embodiment of the disclosure, here the laundry treatment device is provided with the electrolysis apparatus according to the first embodiment.

Referring to FIG. 5, the laundry treatment device according to the second embodiment of the disclosure is identical to the first embodiment as described above with respect to most of their structures, except that in the second embodiment, two electrode plates 22 are arranged on a bottom wall, in a height direction, of the outer cylinder 61, that is, the two electrode plates 22 are arranged at the lowest position of the outer cylinder 61, therefore even when there is only a small amount of water in the outer cylinder 61, the electrode plates 22 are still able to contact the water in the outer cylinder 61.

Third Embodiment

The laundry treatment device according to the third embodiment of the disclosure is provided with a water inlet channel communicating with the cylinder assembly 60, and the electrolysis apparatus 2 is arranged on the water inlet channel to electrolyze water in the water inlet channel. According to the laundry treatment device of the third embodiment, the electrolysis apparatus 2 is arranged on the water inlet channel, no additional water pump is used, the electrolysis apparatus 2 may be normally used regardless of presence or absence of water in the outer cylinder 61 or the inner cylinder 62, and water entering the outer cylinder 61 or the inner cylinder 62 may be electrolyzed.

It may be understood that according to the laundry treatment device of the third embodiment, the inner cylinder 62 may be a perforated inner cylinder or a non-perforated inner cylinder.

Figure 12:
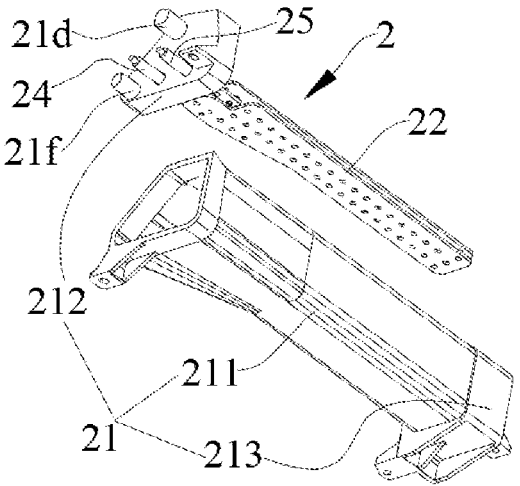
FIG. 12 illustrates a schematic structural diagram of an electrolysis apparatus according to a second embodiment of the disclosure.
Figure 13:
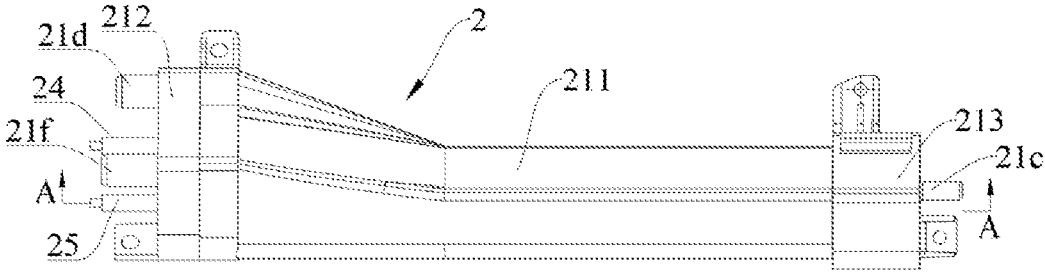
FIG. 13 illustrates a schematic assembling diagram of the structure as shown in FIG. 12.
Figure 14:
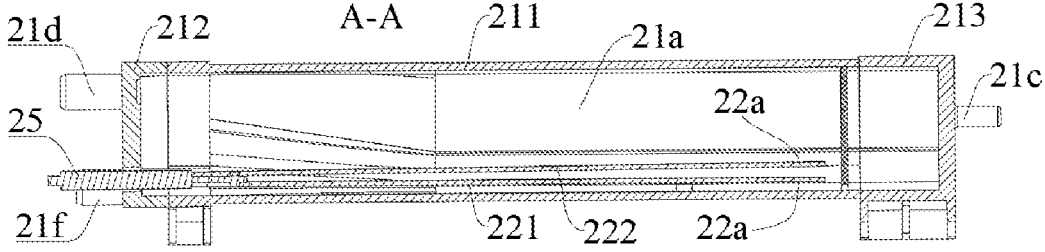
FIG. 14 illustrates a cross-sectional view along the A-A direction of FIG. 13.

In an embodiment, referring to FIGS. 12 to 14, the electrolysis apparatus 2 further includes a shell 21 in which an electrolysis cavity 21a, as well as a to-be-electrolyzed water inlet 21c and an electrolyzed water outlet 21d communicating with the electrolysis cavity 21a are formed, and the cathode plate 221 and the anode plate 222 are arranged within the electrolysis cavity 21a, and an end, close to the cathode plate 221, of the cathode conductive connector 24 is located inside of the shell 21, while an end, away from the cathode plate 221, of the cathode conductive connector 24 is located outside of the shell 21, and an end, close to the anode plate 222, of the anode conductive connector 25 is located inside of the shell 21, while an end, away from the anode plate 222, of the anode conductive connector 25 is located outside of the shell 21, and the electrolysis cavity 21a is located in the water inlet channel, that is, water in the water inlet channel may flow through the electrolysis cavity 21a.

When the electrolysis apparatus 2 is assembled, corresponding pipelines may be connected to the to-be-electrolyzed water inlet 21c and the electrolyzed water outlet 21d respectively, what need to do only is install the electrolysis apparatus 2 in a proper space, and excessive structural changes do not need to be made on the laundry treatment device.

Figure 9:
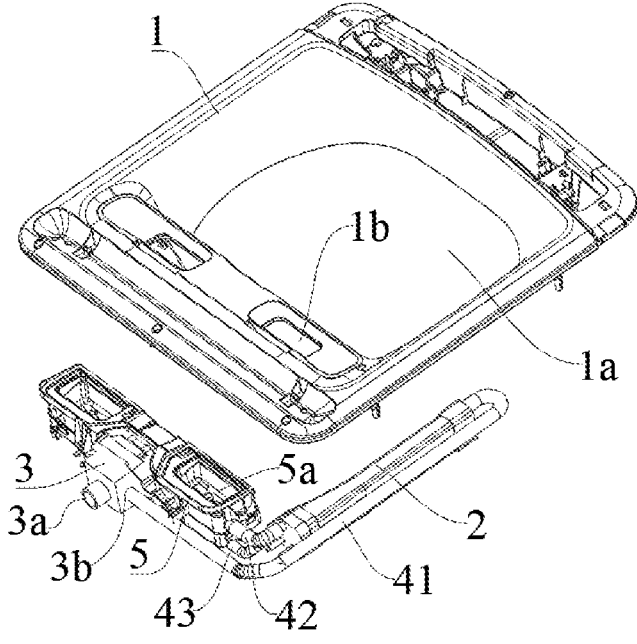
FIG. 9 illustrates a schematic partial-exploded diagram of the structure as shown in FIG. 8.
Figure 10:
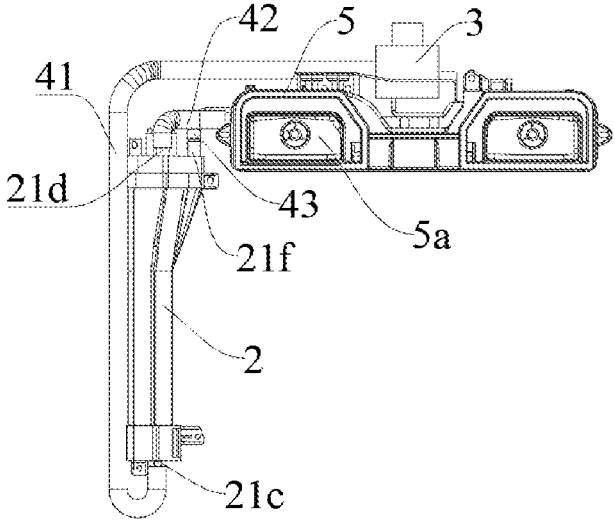
FIG. 10 illustrates a schematic assembling diagram of the electrolysis apparatus, a detergent box and a water inlet valve in the structure as shown in FIG. 9.
Figure 11:
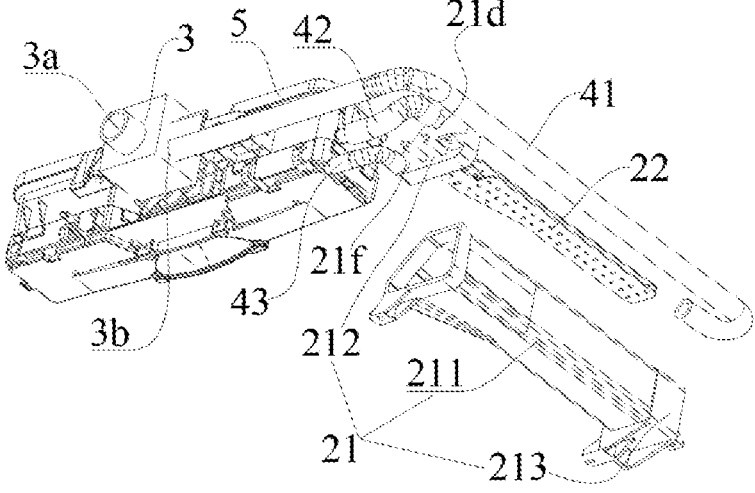
FIG. 11 illustrates a schematic partial-exploded diagram of the structure as shown in FIG. 10.

In an embodiment, referring to FIG. 9, the laundry treatment device includes a water inlet valve 3 and a detergent box 5 provided with a storage tank 5a for containing a detergent. The type of the detergent contained in the storage tank 5a is not limited, for example, the detergent may be a granular substance such as washing powder or a viscous substance such as liquid laundry detergent, and there is no limitation thereto. The to-be-electrolyzed water inlet 21c communicates with the water inlet valve 3, the electrolyzed water outlet 21d communicates with the storage tank 5a to guide electrolyzed water within the electrolysis cavity 21a to the storage tank 5a, exemplarily, the electrolyzed water outlet 21d communicates with the storage tank 5a through a second pipeline 42.

When the laundry treatment device works, tap water enters the electrolysis cavity 21a from the to-be-electrolyzed water inlet 21c, the electrolyzed water electrolyzed by the cathode plate 221 and the anode plate 222 contains a lot of microbubbles and ·OH, the electrolyzed water enters the storage tank 5a and dilutes the detergent stored in the storage tank 5a, the microbubbles may accelerate the dissolution of the detergent, and the dissolved detergent enters the outer cylinder 61 or the inner cylinder 62 together with the electrolyzed water; moreover, the electrolysis apparatus 2 is arranged on the water inlet channel, since water in the water inlet channel is tap water, fluffs are not mixed in the water in the water inlet channel, therefore the situation that the fluffs block the electrode plates 22 may be avoided.

In an embodiment, the water inlet valve 3 is provided with a water inlet 3a, a first water outlet 3b and a second water outlet, here the first water outlet 3b communicates with the to-be-electrolyzed water inlet 21c, exemplarily the first water outlet 3b communicates with the to-be-electrolyzed water inlet 21c through a first pipeline 41; and the second water outlet communicates with the storage tank 5a, and the water inlet valve 3 may selectively communicate the water inlet 3a with the first water outlet 3b or the second water outlet.

When sterilization and disinfection need to be carried out through the electrolyzed water, the water inlet 3a communicates with the first water outlet 3b, tap water enters the electrolysis cavity 21a through the water inlet valve 3, and the electrolyzed water electrolyzed through the cathode plate 221 and the anode plate 222 enters the storage tank 5a and finally enters the outer cylinder 61 or the inner cylinder 62. When sterilization and disinfection are not needed, the water inlet 3a communicates with the second water outlet, tap water directly enters the storage tank 5a through the water inlet valve 3 and finally enters the outer cylinder or the inner cylinder 62, that is, in case that sterilization and disinfection are not needed, the tap water directly enters the storage tank 5a through the water inlet valve 3 and does not need to pass through the electrolysis cavity 21a, therefore, in case that sterilization and disinfection are not needed, a water flowing speed may be accelerated, and the washing time is shortened.

In an embodiment, the electrolyzed water outlet 21d is located at an end, close to the detergent box 5, of the shell 21, and the to-be-electrolyzed water inlet 21c is located at an end, away from the electrolyzed water outlet 21d, of the shell 21. In case that the position of the electrolysis apparatus 2 is not changed, the distance between the electrolyzed water outlet 21d and the electrolysis cavity 21a is smaller than the distance between the to-be-electrolyzed water inlet 21c and the electrolysis cavity 21a, so that the electrolyzed water in the electrolysis cavity 21a may enter the storage tank 5a by going through a shorter distance, and microbubbles in the electrolyzed water may accelerate dissolution of the detergent more effectively.

Figure 8:
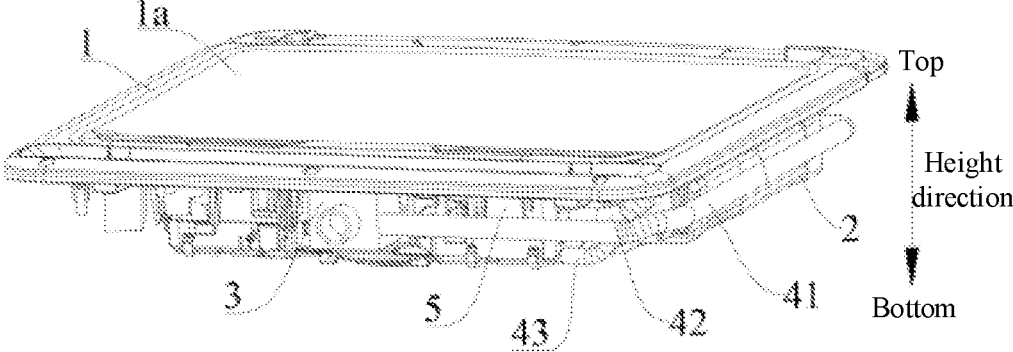
FIG. 8 illustrates a schematic diagram of the structure as shown in FIG. 6 from another perspective.

The electrolysis apparatus 2 is installed in a proper space in the laundry treatment device. In an embodiment, referring to FIGS. 8 and 9, the laundry treatment device includes a workbench 1 which is used as a main body frame at the top of the laundry treatment device and is provided with a laundry feeding opening 1a facing upward, through which laundries are fed into the inner cylinder 62. The electrolysis apparatus 2 is fixedly connected to a bottom side of the workbench 1, i.e., the electrolysis apparatus 2 is located on the side, facing the cylinder assembly 60, of the workbench 1. According to the laundry treatment device of the embodiment of the disclosure, the electrolysis apparatus 2 and the workbench 1 are integrated together, so that assembling may be facilitated, and specifically, during assembling, the electrolysis apparatus 2 and the workbench 1 may be assembled into a whole firstly, the workbench 1 is relatively simple in structure and is of an open structure, which facilitates the electrolysis apparatus 2 to be installed therein, and then the workbench 1 and the cylinder assembly 60 are assembled, so that the assembly difficulty may be reduced, the assembly speed may be improved, the production time may be saved, and the production cost may be reduced. Furthermore, space at the bottom side of the workbench 1 is fully utilized through installation of the electrolysis apparatus 2, therefore the laundry treatment device may be more compact in structure. Moreover, the electrolysis apparatus 2 according to the embodiment of the disclosure does not affect the sealing performance of the outer cylinder 61, and does not affect the mounting structure of the outer cylinder 61.

Figure 7:
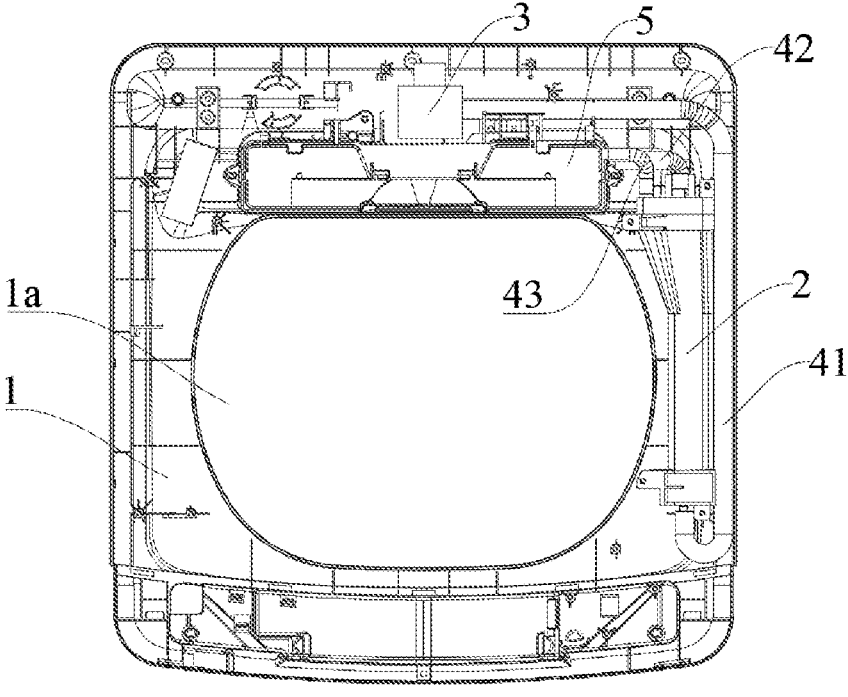
FIG. 7 illustrates a bottom view of the structure as shown in FIG. 6.

In an embodiment, the detergent box 5 is fixedly connected to the bottom side of the workbench 1. The detergent box 5 may be arranged on any side, along the laundry feeding opening 1a, of the workbench 1, for example, on a rear side or a front side, along the laundry feeding opening 1a, of the workbench 1, or on any transverse side, along the laundry feeding opening 1a, of the workbench 1. In the embodiment of the disclosure, referring to FIG. 7, the detergent box 5 is arranged on the rear side, along the laundry feeding opening 1a, of the workbench 1. In general, a water inlet pipe is arranged on a rear side of the laundry treatment device, so that in the embodiment of the disclosure, the detergent box 5 is arranged on the rear side, along the laundry feeding opening 1a, of the workbench 1, a length of the water inlet pipe communicating with the detergent box 5 may be reduced, distribution of the pipe is facilitated, and the workbench 1 may be compact in structure. Furthermore, the rear side and the front side of the workbench 1 generally have large space, the front side of the workbench 1 may facilitate the arrangement of an operation panel so that the operation panel is closer to the user, then the user may use the operation panel more conveniently, thus the detergent box 5 may be arranged on the rear side, along the laundry feeding opening 1a, of the workbench 1.

Referring to FIG. 9, the workbench 1 is provided with a detergent feeding opening 1b penetrating the workbench 1 in a height direction of the laundry treatment deceive, and the detergent box 5 is hermetically arranged around the detergent feeding opening 1b. When a detergent needs to be fed, the detergent is directly fed into the detergent box 5 from the detergent feeding opening 1b. It may be understood that in some embodiments, a shield cover may also be arranged at the detergent feeding opening 1b to cover the detergent feeding opening 1b to prevent debris from entering the detergent box 5.

Figure 6:
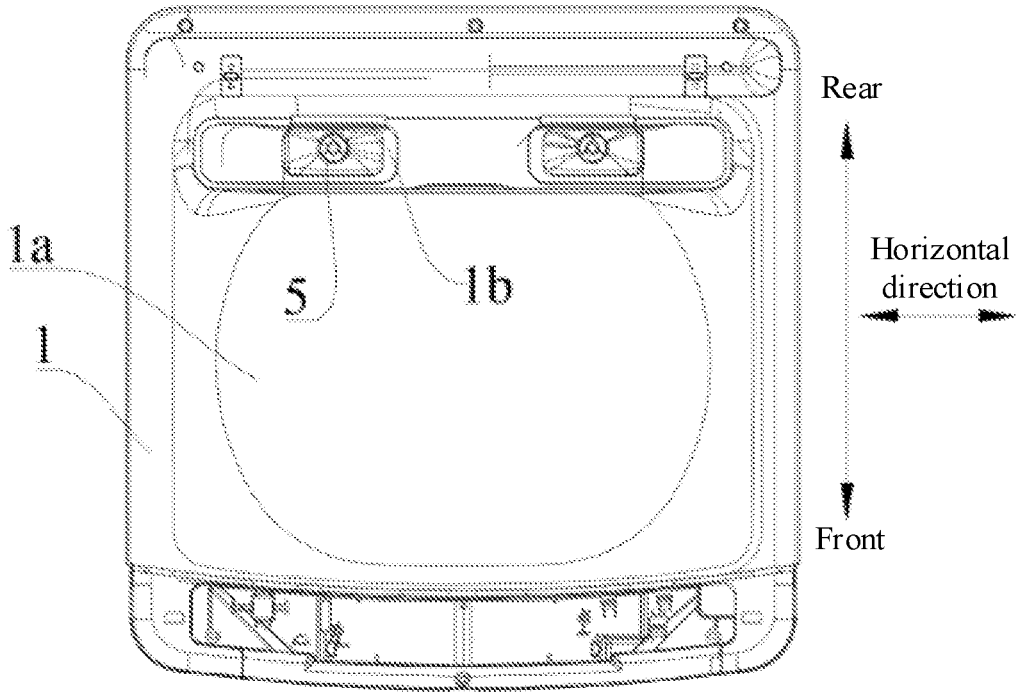
FIG. 6 illustrates part of a schematic structural diagram of a laundry treatment device according to a third embodiment of the disclosure, here the laundry treatment device is provided with an electrolysis apparatus according to a second embodiment.

It should be noted that in the embodiment of the disclosure, the front side, the rear side, or the transverse side, along the laundry feeding opening 1a, of the workbench 1 is defined by referring to the orientation with the laundry feeding opening 1a used as the reference in the projection on a horizontal plane, and taking a paper surface shown in FIG. 6 as the horizontal plane.

The electrode plates 22 and the detergent box 5 are located on different sides, along the laundry feeding opening 1a, of the workbench 1, therefore installation space at the bottom side of the workbench 1 may be fully utilized.

Specifically, in the embodiment of the disclosure, the electrolysis apparatus 2 is located on the transverse side, along the laundry feeding opening 1a, of the workbench 1, that is, in case of reasonable structural distribution and arrangement, the distance between the electrolysis apparatus 2 and the detergent box 5 may be shortened, so that the length of pipelines may be reduced, and the structural arrangement is more reasonable.

In an embodiment, two electrode plates 22 both extend in the horizontal plane, referring to FIG. 14, the two electrode plates 22 are arranged to be stacked in a vertical direction. Therefore, the size, in the height direction of the laundry treatment device, of the workbench 1 is basically not affected in case that the two electrode plates 22 have large electrolytic surface areas.

In an embodiment, referring to FIG. 13, the shell 21 is provided with a water outlet 21f positioned lower than the electrolyzed water outlet 21d and configured to evacuate the water in the electrolysis cavity 21a. When the laundry treatment device does not need to use sterilization and disinfection functions, that is, when the electrolysis apparatus 2 does not need to be activated, water in the electrolysis cavity 21a may be evacuated through the water outlet 21f, therefore the water in the electrolysis cavity 21a is prevented from being deteriorated and smelly in case that the laundry treatment device is not used for a long time.

It should be noted that water drained from the water outlet 21f may be drained to the outside of the laundry treatment device, or may also be directly or indirectly drained into the outer cylinder 61 or the inner cylinder 62. In the embodiment of the disclosure, referring to FIG. 8, the water outlet 21f and the electrolyzed water outlet 21d are arranged on the same side of the shell 21, i.e., the water outlet 21f is also arranged on the side, close to the detergent box 5, of the shell 21; the water outlet 21f communicates with the storage tank 5a, exemplarily, the water outlet 21f communicates with the storage tank 5a through a third pipeline 43, that is, water drained from the water outlet 21f flows to the detergent box 5 through the third pipeline 43; and a passage area of the water outlet 21f is smaller than a passage area of the electrolyzed water outlet 21d. Specifically, the water outlet 21f and the electrolyzed water outlet 21d are arranged on the same side of the shell 21, that is, water drained from the water outlet 21f is also the electrolyzed water electrolyzed by the electrolysis electrode, and thus it is ensured that water entering the storage tank 5a from the water outlet 21f is also the electrolyzed water after electrolysis. Furthermore, since the passage area of the water outlet 21f is smaller than the passage area of the electrolyzed water outlet 21d, a flow resistance of liquid flowing from the electrolyzed water outlet 21d to the storage tank 5a is smaller than a resistance of the liquid flowing from the water outlet 21f to the storage tank 5a, so that most of the electrolyzed water may still flow from the electrolyzed water outlet 21d to the storage tank 5a and a small part of the electrolyzed water may flow from the water outlet 21f to the storage tank 5a.

When the electrolyzed water does not need to be used, no water enters the electrolysis cavity 21a, a height of a liquid level in the electrolysis cavity 21a is reduced, and when the height of the liquid level is lower than a height of the electrolyzed water outlet 21d, water in the electrolysis cavity 21a is not drained from the electrolyzed water outlet 21d, but is drained from the water outlet 21f until water in the electrolysis cavity 21a is evacuated. In the embodiment of the disclosure, both the electrolyzed water outlet 21d and the water outlet 21f are arranged as described above, to basically guarantee that water flowing into the storage tank 5a is electrolyzed water which is fully electrolyzed, and also to guarantee that water in the electrolysis cavity 21a may be evacuated, water in the water outlet 21f may be guided into the storage tank 5a through a short pipeline only, the structure is simple, a valve is not needed, and thus the production and manufacturing cost may be reduced.

In an embodiment, referring to FIG. 12, the shell 21 includes a shell body 211, as well as a first end cover 212 and a second end cover 213 hermetically arranged at two ends, opposite in a length direction, of the shell body 211, a hollow containing space is enclosed by the shell body 211, the first end cover 212 and the second end cover 213 together, the electrolysis cavity 21*a* is formed by at least a part of the containing space, the electrolyzed water outlet 21*d* is formed in the first end cover 212, and the to-be-electrolyzed water inlet 21*c* is formed in the second end cover 213. It may be understood that at the connection of the first end cover 212 and the shell body 211, it requires a sealed connection to prevent water leakage, and at the connection of the second end cover 213 and the shell body 211, it requires a sealed connection to prevent water leakage.

The embodiments/implementations provided in the disclosure may be combined with each other without conflict.

What is claimed is:

1. A laundry treatment device, comprising:

a cylinder assembly, comprising an outer cylinder and an inner cylinder rotationally arranged within the outer cylinder; and an electrolysis apparatus configured to electrolyze water;

wherein the electrolysis apparatus comprises two electrode plates, one of the electrode plates is a cathode plate, the other of the electrode plates is an anode plate, and the cathode plate and the anode plate are arranged in a stack;

wherein the electrode plates comprises:

a plurality of through holes penetrating formed within the electrode plates in a thickness direction of the electrode plates;

a cathode conductive connector, in conductive connection with the cathode plate; and an anode conductive connector, in conductive connection with the anode plate;

wherein a distribution density of the plurality of through holes in the electrode plates is 1-10/cm$^2$;

wherein the through holes in the anode plate correspond and align with the through holes in the cathode plate;

wherein the cathode plate and the anode plate are arranged between the outer cylinder and the inner cylinder, and an end, away from the anode plate, of the anode conductive connector is located outside of the outer cylinder, and an end, away from the cathode plate, of the cathode conductive connector is located outside of the outer cylinder;

wherein the two electrode plates are arranged on an inner wall of the outer cylinder in a height direction.

2. The laundry treatment device of claim 1, wherein each of the through holes is circular and has a diameter of 2 mm to 5 mm.

3. The laundry treatment device of claim 1, wherein a distance between adjacent two of the through holes is 2 mm to 10 mm.

4. The laundry treatment device of claim 1, wherein a distance between the through hole closest to an edge of the electrode plate and the edge of the electrode plate is 2 mm to 10 mm.

* * * * *